United States Patent [19]
Bertocchi

[11] Patent Number: 5,283,078
[45] Date of Patent: Feb. 1, 1994

[54] PROCESS FOR TREATING FRUITS OR VEGETABLES WITH COMPRESSION STRESSES

[76] Inventor: Primo Bertocchi, 8, Via Argonne, 43100 Parma, Italy

[21] Appl. No.: 851,422

[22] Filed: Mar. 13, 1992

[30] Foreign Application Priority Data

Mar. 22, 1991 [IT] Italy .................. PR91 A 000013

[51] Int. Cl.⁵ ............................................. A23L 1/00
[52] U.S. Cl. .................................... 426/665; 426/482
[58] Field of Search ............... 426/482, 483, 518, 665

[56] References Cited

U.S. PATENT DOCUMENTS

| | | | |
|---|---|---|---|
| 2,181,442 | 11/1939 | Watkins | 99/474 |
| 4,301,183 | 11/1981 | Giguere | 426/482 |
| 4,643,085 | 2/1987 | Bertocchi | 99/510 |

FOREIGN PATENT DOCUMENTS 363740  8/1906  France.
754738 11/1933  France.

*Primary Examiner*—George Yeung
*Attorney, Agent, or Firm*—Laff, Whitesel, Conte & Saret

[57] ABSTRACT

The invention relates to a procedure and a device for the treatment of a product containing pulp destined for the extraction of juices and purées. The procedure subjects the product to be treated to a series of compression stresses in rapid succession, to reduce the product consistency and to increase its tendency to peel from its skin. The device which performs the above procedure comprises two shaped moving walls defining internally a cavity inside of which the product to be treated flows. The procedure and the device offer excellent pulp treatment results while avoiding the necessity of heating the said pulp before separation between purée and scrap.

4 Claims, 3 Drawing Sheets

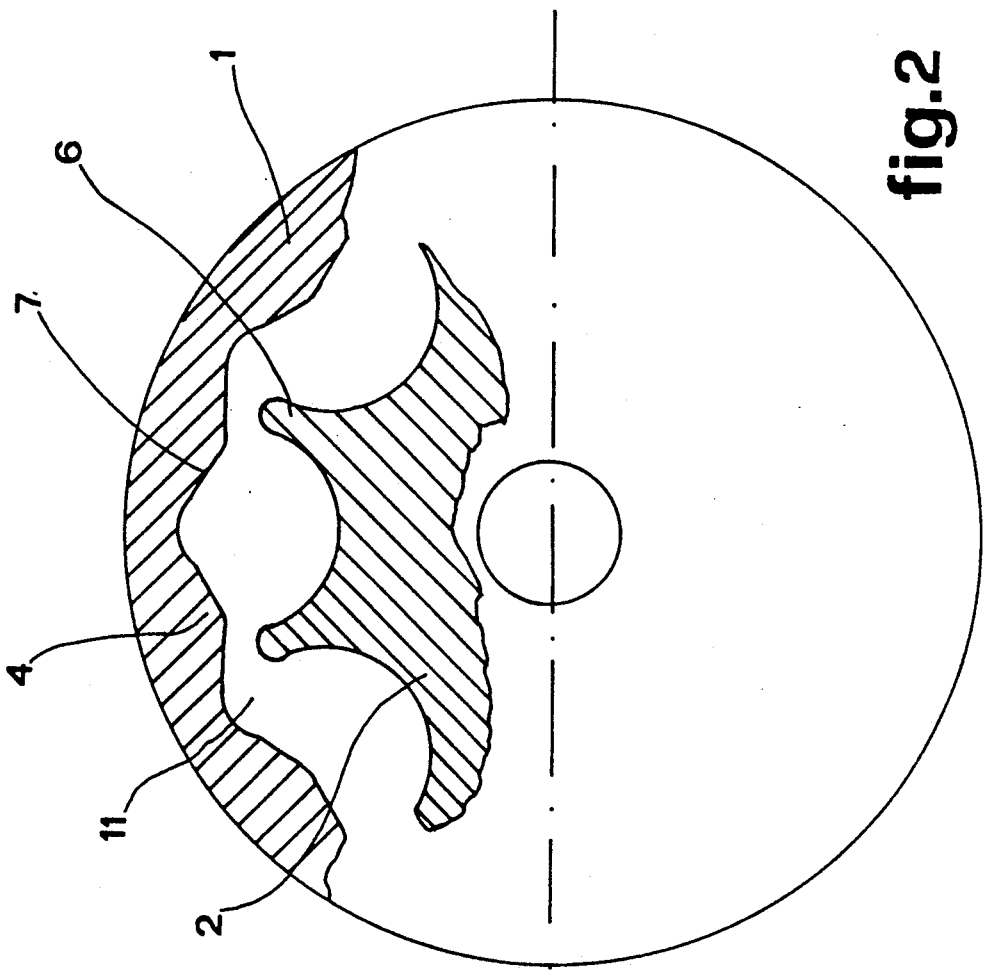
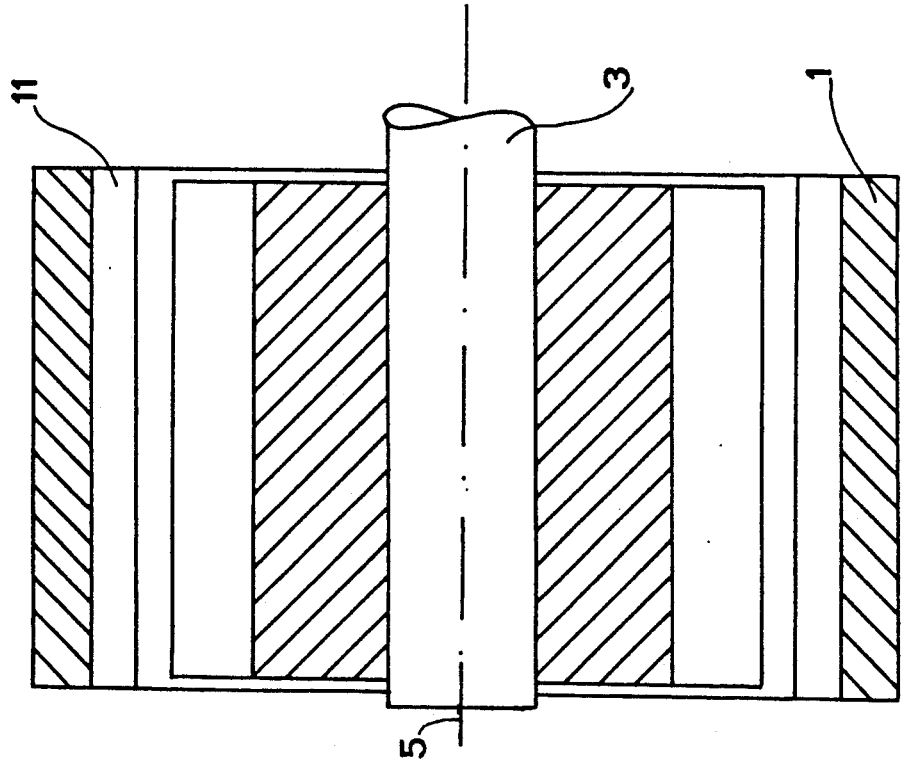

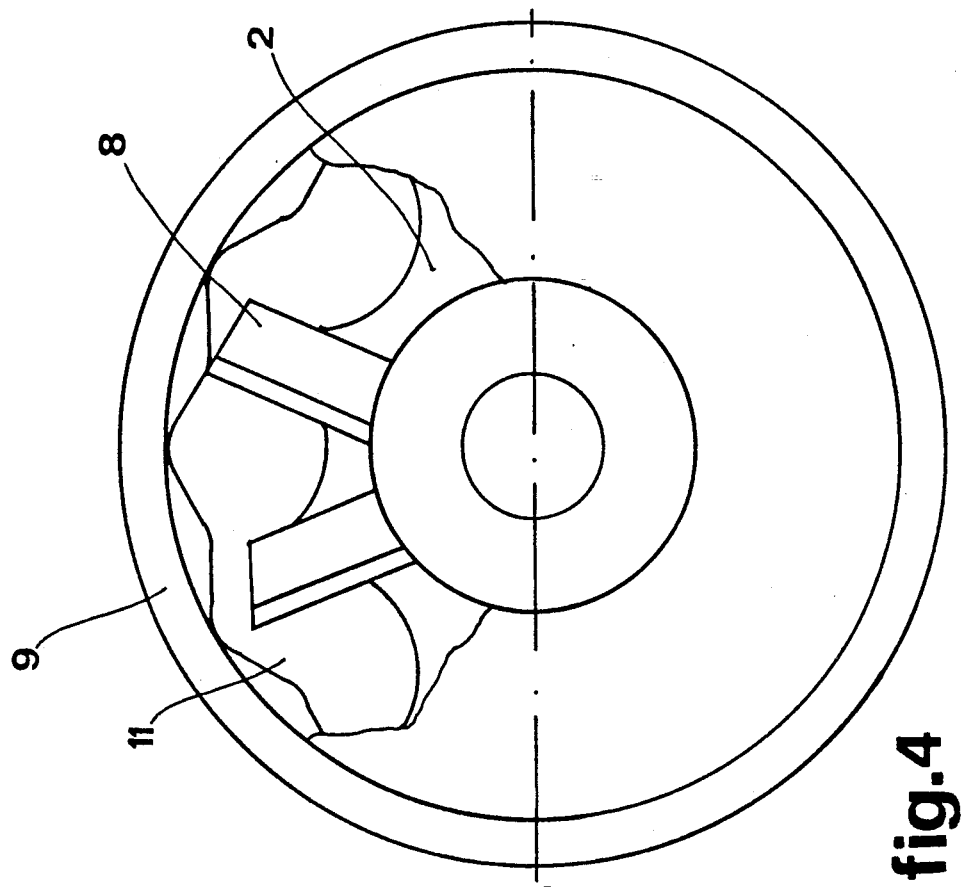
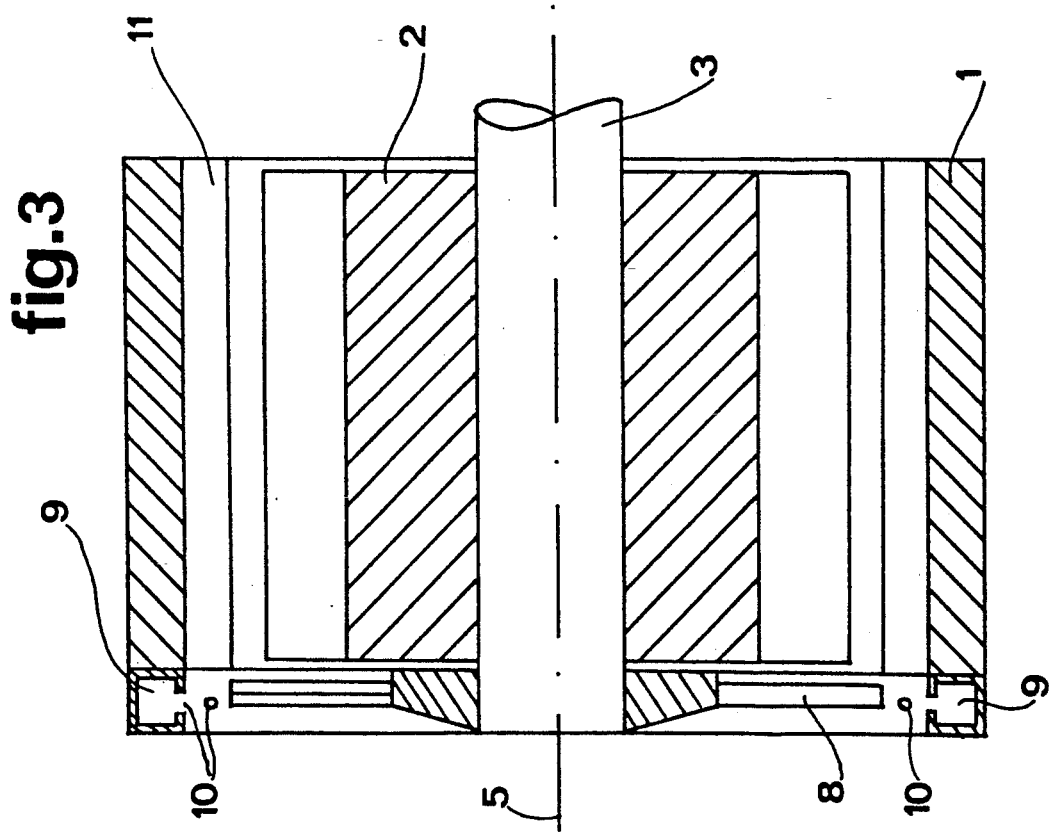

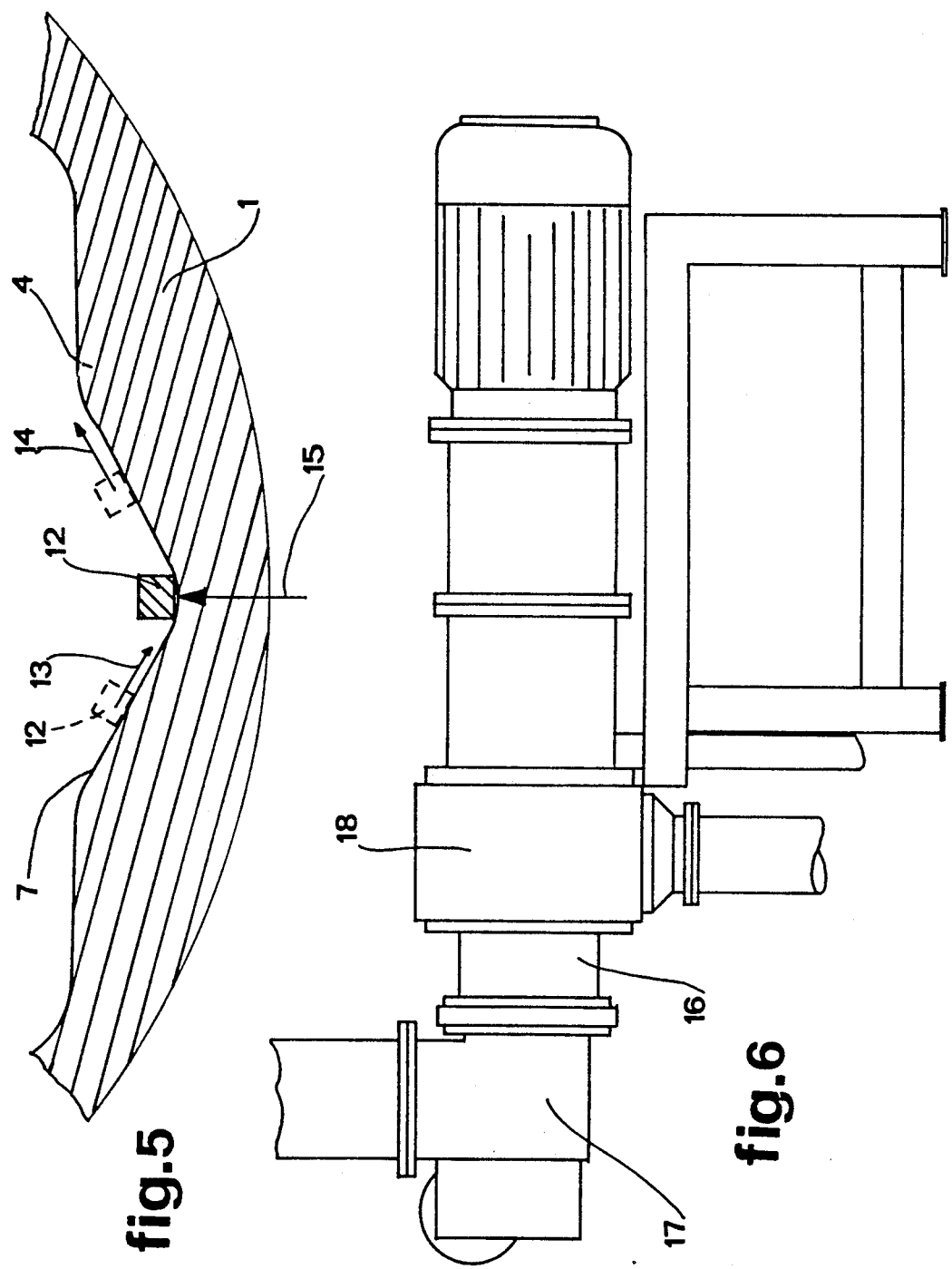

PROCESS FOR TREATING FRUITS OR VEGETABLES WITH COMPRESSION STRESSES

BACKGROUND OF THE INVENTION

The invention relates to a procedure for the preparation of vegetable pulp destined for juice and purée extraction, and a device for the enacting of the said procedure.

At present the work cycle for vegetable pulps in order to prepare them for the extraction of their juice and purée is normally constituted by the trituration of the fruit followed by heating, with the aim of making the successive separation of the useful part from the scrap easier.

Indeed, raising the temperature induces in the pulp a loss of consistency, a tendency to peel and a greater ease of detachment from the skin, which helps greatly in the passage of the purée through the holes of the sieve of the strainer which performs the separation.

Heating the triturate containing all of the parts of the fruit causes, however, drawbacks of an operative nature, such as blocking and consequent imperfect functioning of the heat exchangers and of the accessory organs, such as the pump and the valves, which have to be frequently halted for cleaning operations, as well as drawbacks due to a qualitative drop in the product itself, thanks to substances both natural and deriving from the chemical treatment of the fruit, which, with the increase in temperature, pass through the sieve as puree rather than being eliminated with the scrap (elements such as skins, stalks, seeds, stones etc).

This important negative aspect of the procedure using heat leads to processes which eliminate the heating of the fruit during this phase, but preparation solely by trituration, on the other hand, runs into considerable difficulties if heat is not applied and the operation is therefore done at room temperature.

In the case of large and dishomogeneous trituration, if the separation is made through relatively small holes, the complete extraction of the puree is not achieved, and a successive treatment of the scrap becomes necessary in order to recuperate the pulp still adhering to the said scrap, while if the separation is performed using sieves with larger holes the degree of extraction improves, but the puree has to undergo further treatment since it is mixed with scrap fragments which must be eliminated.

In the case of very small trituration, the degree of extraction even when working with small holes is greater, but the product quality suffers because of the high percentage of fragments in it, deriving from the fragmentation of the scrap due to the very fast action of the trituration.

In any case, therefore, extraction of the purée at room temperature, since it lacks the necessary "softening" of the pulp, is to be considered an unsatisfactory solution, born of a compromise between quantitative efficiency, product quality and operative simplicity, all of which objectives are difficult to achieve all together if the separation is to be done using prior art means and without heating.

SUMMARY OF THE INVENTION

An aim of the present invention is that of eliminating the above-described drawbacks by means of a procedure and a device which, as far as the modifications in the pulp consistency are concerned, produce, with a purely mechanical action, similar effects to those attained by heating.

The inventive concept originates from the fact that when vegetable pulp is subjected to a succession of compression processes, its consistency diminishes considerably while its tendency to peel and separate from the skin increases; thus a result which is similar to that obtained by heating is arrived at, but without any of the drawbacks that heating presents.

This and other aims are fully attained by the procedure for the preparation of vegetable pulps which is the object of the present invention, characterised by the fact that it envisages the subjection of the product to be treated to a sequence of compression stresses in rapid succession, which processes are aimed at reducing the consistency of the product and at increasing the tendency of the same product to peel and separate from its skin.

An object of the present invention is also a device for enacting the above-described procedure, characterised by the fact that it comprises two shaped walls describing a cavity inside which the product to be treated flows, the said shaped walls being moved in such a way as to subject the product to a sequence of compression stresses in rapid succession.

BRIEF DESCRIPTION OF THE DRAWINGS

These and other characteristics will better emerge from the following description of a preferred embodiment illustrated purely in the form of a non-limiting example in the accompanying drawings, in which:

FIGS. 1 and 2 show the device schematically, in two sections made according to reciprocally perpendicular lines;

FIGS. 3 and 4 show schematically, in longitudinal section and in a frontal view from the intake side, the device eauipped with a rotating-blade cutter and a gas feeding duct;

FIG. 5 shows schematically a particular of the journey of a particle of product inside the device;

FIG. 6 shows the device inserted between a screw feeder and a strainer of known type.

DESCRIPTION OF THE PREFERRED EMBODIMENTS

With reference to FIGS. 1 and 2, number 1 denotes a fixed stator, constituted by a hollow element, cylindrical or conical, which element's internal surface is equipped with a plurality of bevelled and rounded projections 4 which extend along the generatrix of the stator, or are skew with respect to the central axis 5 of the stator. The height of the said projections, or rather their radial extension towards the axis 5 depends on the nature of the material to be treated, not illustrated, constituted by fruit pulp or other vegetable substances.

2 indicates a rotor, keyed on a shaft 3 which is coaxial to the central axis 5 of the stator.

The active part of the rotor 2 is the external surface, inscribable in a cylinder or a cone, equipped with projections 6 with rounded corners extending along the generatrix of the rotor or are skew with respect to its central rotation axis.

The vegetable pulp flows in a cavity 11 of the device which is created between the internal surface of the stator and the external surface of the rotor.

The rotor 2 presses on the mass of pulp which is travelling in the cavity 11 with a rotary motion which by centrifugal effect keeps the said mass pressed against the stator 1, forcing it to follow its motion.

The inclined sides 7 of the projections 4 of the stator 1 cause in this way variations in the movement of the pulp which generate on the said pulp the elevated sequence of compression stresses useful for the purposes of the treatment.

In order better to understand this process, this fact is illustrated schematically in FIG. 5, where, considering a single particle of pulp 12, an arrow 13 indicates the direction of the movement of the said particle 12 on the side 7 of a projection 4, and an arrow 14 indicates the direction of the movement on the adjacent side 7 of the successive projection 4.

It is evident that the change in direction from the arrow 13 to the arrow 14 happens by force, indicated by another arrow 15, exercised on the particle by the surface of the stator 1.

This force, acting on the mass of pulp, gives rise to the desired compression stress.

The feeding of the product into the inlet of the device can occur by force of gravity if the device has a vertical axis 5 or by means of a screw feeder of known type if the device has a horizontal axis.

The device receives the pulp at one end, untriturated but cut into slices or strips of uniform thickness by a rotating blade cutter 8 illustrated schematically in FIGS. 3 and 4 and applied on the axis of the device, or whole fruits can be introduced if of limited dimensions.

The device unloads the treated pulps at the other end, ready for the separation operation of the purée from the scrap.

This separation is performed in a strainer of known type such as for example the strainer object of Italian Patent no. 1199392 in the name of the present applicant.

In FIGS. 3 and 4 a feeder duct 9 is also shown, circular in shape, mounted in proximity to the inlet and exhibiting a plurality of apertures or fissures 10 opening towards the inside.

The said feeder duct 9 introduces an adjustable flow of gas into the cavity 11 so that the treatment can be done in a controlled atmosphere. This possibility is particularly useful in the case of products which are very sensitive to oxidation, since by introducing gas of a certain type, such as nitrogen, the level of oxygen can be reduced.

The device can function as an autonomous unit or it can be mounted as an inlet feeder on the same shaft as a strainer from which it receives motorisation and of which it becomes an integral part.

With reference to FIG. 6, 16 denotes the device, 17 a screw feeder and 18 the strainer. With the operating unit thus composed, being linear and compact, the separation of the purée from the scrap beginning with the whole fruit can be performed in one step, thus eliminating the connections which, according to the prior art, are necessary, with the use of several machines connected in series.

A mention should also be made of the considerable savings to be made and the practicality of the invention.

Thus the need for pre-heating the pulp is eliminated using the present invention, while equally excellent results are obtained in the treatment of the same.

What is claimed is:

1. A process for the treatment of a product containing pulp destined for juice and puree extraction, comprising subjecting a product selected from the group consisting of fruit and vegetables to a non-juice extracting sequence of stresses in rapid succession, which stresses reduce the consistency of the product and increase the said product's tendency to peel and separate from its skin.

2. The process of claim 1 comprising: feeding the product to a device having a fixed stator and a rotor, said fixed stator having rounded projections on the internal surface thereof the rotor presses on the product with a rotary motion and a centrifugal effect which forces the product to follow the internal surface of the stator in which the product is travelling.

3. The process of claim 1 comprising: feeding the product to a device having a fixed stator and a rotor, said fixed stator having rounded projections on the internal surface thereof, passing the product through impacts and variations in its movement along the stator which generate on the product an elevated sequence of stresses which soften the product.

4. A process for treating a product containing pulp selected from the group consisting of fruits and vegetables, said pulp having a consistency which enables said pulp to be destined for juice and puree extraction, comprising centrifically impacting the product against a stator wall with a rotor having a rotor projection, said rotor projection having rounded corners, said stator wall having a plurality of rounded projections, moving said product along said stator wall, increasing the stresses on said product as said product moves along said stator wall, which stresses reduce the consistency of the product and increase the said product's tendency to peel and separate from its skin, and recovering the treated product from said stator.

* * * * *